(12) United States Patent
Wei et al.

(10) Patent No.: US 7,168,250 B2
(45) Date of Patent: Jan. 30, 2007

(54) ENGINE VALVE SYSTEM AND METHOD

(75) Inventors: Puning Wei, Naperville, IL (US); Zhengbai Liu, Naperville, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/111,324

(22) Filed: Apr. 21, 2005

(65) Prior Publication Data

US 2006/0236693 A1     Oct. 26, 2006

(51) Int. Cl.
*F02B 33/44* (2006.01)
*F02B 47/08* (2006.01)
*F02M 25/07* (2006.01)
*F16K 11/085* (2006.01)
*F16K 11/044* (2006.01)

(52) U.S. Cl. ............ 60/605.2; 60/612; 123/568.2; 123/568.12; 123/568.23; 137/625.46; 137/625.5

(58) Field of Classification Search ............ 60/605.1, 60/605.2, 612; 123/568.2, 672, 562, 568.12, 123/568.23, 568.24, 568.25, 568.29; 137/625.46, 137/625.47, 625.48, 625.5
See application file for complete search history.

(56) References Cited

U.S. PATENT DOCUMENTS

| | | | | |
|---|---|---|---|---|
| 3,955,597 | A | * | 5/1976 | Oneyama et al. ...... 137/625.48 |
| 4,080,990 | A | | 3/1978 | De Benedetti |
| 4,286,624 | A | * | 9/1981 | Clausen et al. ........ 137/625.46 |
| 4,821,776 | A | * | 4/1989 | Ariizumi et al. ......... 137/625.5 |
| 4,924,911 | A | * | 5/1990 | Schmalenbach et al. . 137/625.5 |
| 5,203,311 | A | | 4/1993 | Hitomi et al. |
| 5,375,622 | A | * | 12/1994 | Houston ................. 137/625.47 |
| 5,810,691 | A | | 9/1998 | Gebhard et al. |
| 6,301,887 | B1 | | 10/2001 | Gorel et al. |
| 6,378,509 | B1 | * | 4/2002 | Feucht et al. ............... 60/605.2 |
| 6,422,222 | B1 | | 7/2002 | Arbeiter et al. |
| 6,729,315 | B2 | * | 5/2004 | Onodera et al. ........... 60/605.2 |
| 6,820,599 | B2 | * | 11/2004 | Kurtz et al. ........... 123/568.21 |
| 6,863,058 | B2 | * | 3/2005 | Kurtz et al. ................ 123/672 |
| 6,899,090 | B2 | * | 5/2005 | Arnold ..................... 60/605.2 |
| 6,945,236 | B2 | * | 9/2005 | Nakai et al. ............... 60/605.2 |
| 6,973,786 | B1 | * | 12/2005 | Liu et al. ................... 60/605.2 |

(Continued)

FOREIGN PATENT DOCUMENTS

JP    58034275 A    *    2/1983

(Continued)

*Primary Examiner*—Thai-Ba Trieu
(74) *Attorney, Agent, or Firm*—Elias P. Soupos; Susan L. Lukasik; Jeffrey P. Calfa

(57) ABSTRACT

An engine system (100) has a valve system (137). An inlet of a turbine (109) is fluidly connected to a first inlet (119) of the valve system (137). An outlet of the turbine (123) is fluidly connected to a second inlet (113) of the valve system (137). An outlet of a compressor (155) is fluidly connected to a first outlet (115) of the valve system (137). An inlet of the compressor (141) is fluidly connected to a second outlet (111) of the valve system (137). An inlet of an exhaust gas recirculation system (133) is fluidly connected to a third outlet (121) of the valve system (137), and an outlet of the exhaust gas recirculation system is fluidly connected to a third inlet (117) of the valve system (137).

19 Claims, 6 Drawing Sheets

U.S. PATENT DOCUMENTS

| | | | |
|---|---|---|---|
| 6,988,365 B2 * | 1/2006 | Sasaki | 60/605.2 |
| 7,013,879 B2 * | 3/2006 | Brookshire et al. | 123/568.2 |
| 7,043,914 B2 * | 5/2006 | Ishikawa | 60/605.2 |
| 2004/0050375 A1 | 3/2004 | Arnold | |
| 2004/0093866 A1 * | 5/2004 | Ishikawa | 60/605.2 |
| 2005/0000497 A1 * | 1/2005 | Nakai et al. | 60/605.2 |
| 2005/0103013 A1 * | 5/2005 | Brookshire et al. | 60/605.2 |
| 2006/0037649 A1 * | 2/2006 | Busani | 137/596 |

FOREIGN PATENT DOCUMENTS

| | | | |
|---|---|---|---|
| JP | 05071428 A | * | 3/1993 |
| JP | 2002276405 A | * | 9/2002 |

* cited by examiner

ENGINE VALVE SYSTEM AND METHOD

FIELD OF THE INVENTION

This invention relates to internal combustion engines, including but not limited to internal combustion engines having Exhaust Gas Recirculation (EGR) systems.

BACKGROUND OF THE INVENTION

One method to control emissions in internal combustion engines is to recirculate exhaust gas into the intake system of the engine. This method is commonly known as Exhaust Gas Recirculation (EGR).

When an engine operates at low engine speeds and loads EGR dilutes intake air with inert carbon dioxide from the exhaust. The EGR amount used, expressed as a percentage of carbon dioxide in the intake air, is typically in the 10% to 50% range. EGR systems optimized for low-end engine operation are often low-pressure systems, in which exhaust gas introduced downstream of a turbine is recirculated upstream of a compressor.

Some engines may be optimized for engine operation during higher engine speeds and loads. EGR systems designed for high-end engine operation are typically high-pressure systems, in which exhaust gas introduced upstream of a turbine is recirculated downstream of a compressor.

There is a need in the industry for optimized performance during both the low-end and high-end of engine operation.

SUMMARY

An engine system has a valve system. An inlet of a turbine is fluidly connected to a first inlet of the valve system. An outlet of the turbine is fluidly connected to a second inlet of the valve system. An outlet of a compressor is fluidly connected to a first outlet of the valve system. An inlet of the compressor is fluidly connected to a second outlet of the valve system. An inlet of an exhaust gas recirculation system is fluidly connected to a third outlet of the valve system, and an outlet of the exhaust gas recirculation system is fluidly connected to a third inlet of the valve system.

A method for use with the engine system comprises the steps of directing high-pressure exhaust gas into an exhaust gas recirculation (EGR) system that outputs recirculated gas into the engine air intake system in a high mode of engine operation, and directing low-pressure exhaust gas into the EGR system in a low mode of engine operation.

DESCRIPTION OF A PREFERRED EMBODIMENT

Most EGR systems include at least one EGR cooler for cooling recirculated exhaust gas and at least one EGR valve for controlling flow. At least one additional valve is added to the engine to select the source of gas supply from the engine and the path of gas return to the engine. The following describes an apparatus and method for the selective use of a high pressure and a low pressure EGR system for an internal combustion engine. A valve system capable of selectively opening and closing exhaust gas and intake air passages on the engine is utilized. The selective use of the gas supply and return path enables the selective use of high or low pressure EGR, or dual mode. EGR, advantageously enabling the optimization of an engine's operation over a wide range.

Figure 1:
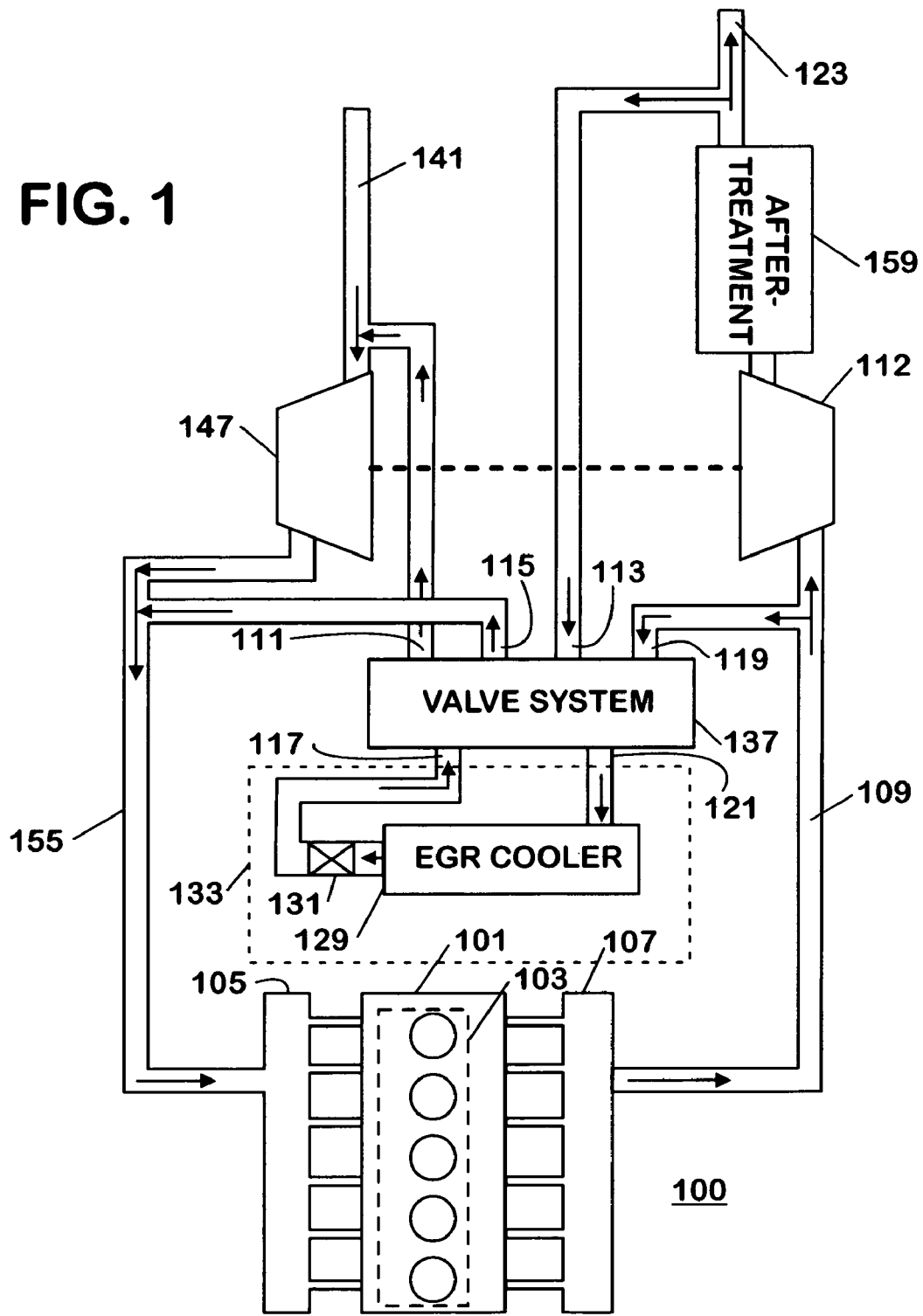
FIG. 1 is a block diagram of an engine in accordance with the invention.

A turbocharged internal combustion engine system 100 that includes an engine 101 with a plurality of pistons 103 in fluid communication with an intake manifold 105 and an exhaust manifold 107 is presented in FIG. 1. A high-pressure region 109 for exhaust gas is considered to exist between the exhaust manifold 107 and a turbine 112 during engine operation. Typical pressures in the high-pressure region 109 may be between about 80 in Hg (270 kPa) to 120 in Hg (406 kPa). Furthermore, a low-pressure region 123 for exhaust gas is considered to exist downstream of the turbine 112 and an after-treatment module 159 during engine operation. The pressure in the low-pressure region 123 may be close to ambient pressure. A high-pressure region 155 for intake charge air is considered to exist between a compressor 147 and the intake manifold 105 during engine operation. The pressure in region 155 may be about 80 in Hg (270 kPa). A low-pressure region 141 for intake air is considered to exist upstream of the compressor 147 during engine operation. The pressure in region 141 may be at or below ambient pressure. An example of an EGR system 133 is also shown, as is known in the art, that includes an EGR cooler 129 in fluid communication with an EGR valve 131. A valve system 137 is shown in fluid communication with the high-pressure regions 109, 155, the low-pressure regions 123, 141, and the EGR system 133.

The valve system 137 permits various fluid connections on the engine system 100 to be made according to the operating mode of the engine. The valve system 137 has a first, a second, and a third inlet, and a first, a second and a third outlet. An inlet of a first turbine 112 is fluidly connected to a first inlet 119 of the valve system 137. An outlet of the first turbine 112 is fluidly connected to a second inlet 113 of the valve system 137. An outlet of a first compressor 147 is fluidly connected to a first outlet 115 of the valve system 137. An inlet of the first compressor 147 is fluidly connected to a second outlet 111 of the valve system 137. An inlet of an exhaust gas recirculation system 133 is fluidly connected to a third outlet 121 of the valve system 137. Finally, an outlet of the exhaust gas recirculation system 133 is fluidly connected to a third inlet 117 of the valve system 137.

Figure 2:
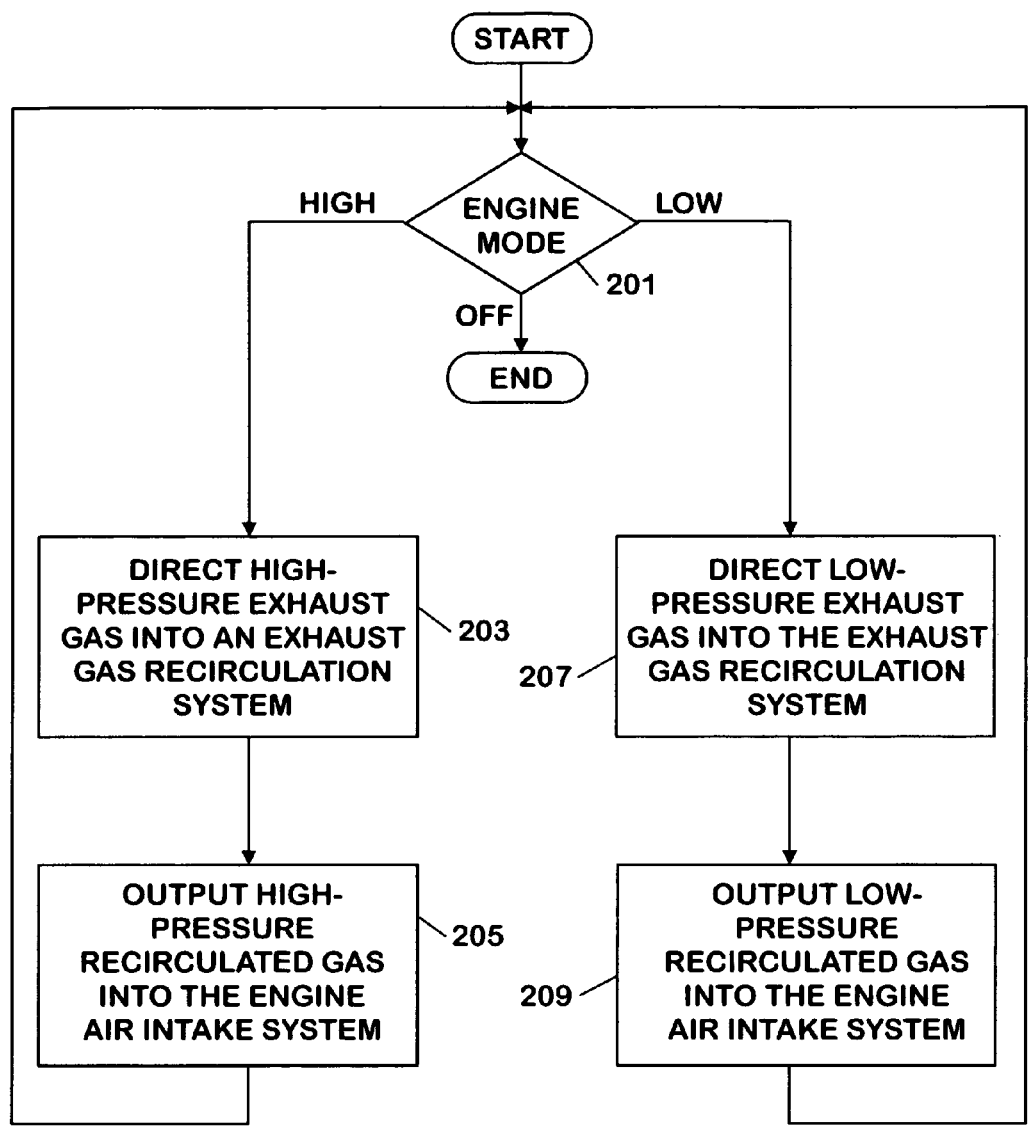
FIG. 2 is a flowchart showing a method of operating an engine in accordance with the invention.

A method for use with the valve system 137 is shown in the flowchart of FIG. 2. At step 201, an engine operating mode is determined. An engine electronic control module (ECM) (not shown) advantageously performs this determination, although other device(s) may be utilized. The determination is performed by comparing the load and speed of the engine to give thresholds that may be based on engine operating parameters or conditions. The engine may operate in either low-mode or high-mode. Low-mode occurs when the engine operates at low engine speed and low engine load. When the engine speed and engine load are high, the engine operates in high-mode.

When the engine operates in high-mode, high-pressure exhaust gas is directed into an exhaust gas recirculation (EGR) system at step 203. In this mode, the valve system 137 fluidly connects the inlet of the first turbine 112 with the exhaust gas recirculation system 133 and with the outlet of the compressor 147. High-pressure exhaust gas from the exhaust gas recirculation system is enters the engine air intake system at step 205. When the engine operates in low-mode, low-pressure exhaust gas is directed into the EGR system at step 207. In this mode, the valve system 137 fluidly connects the outlet of the first turbine 112 with the exhaust recirculation system 133 and with the inlet of the compressor 147. Low-pressure exhaust gas from the exhaust recirculation system 133 is output into the engine air intake system at step 209.

The engine system 100 remains advantageously unchanged regardless of the operating mode, and switching between a high-pressure EGR mode and a low-pressure EGR mode at step 201 is accomplished by switching the position of the valve system 137, which is appropriately arranged and constructed for this function.

Figure 3:
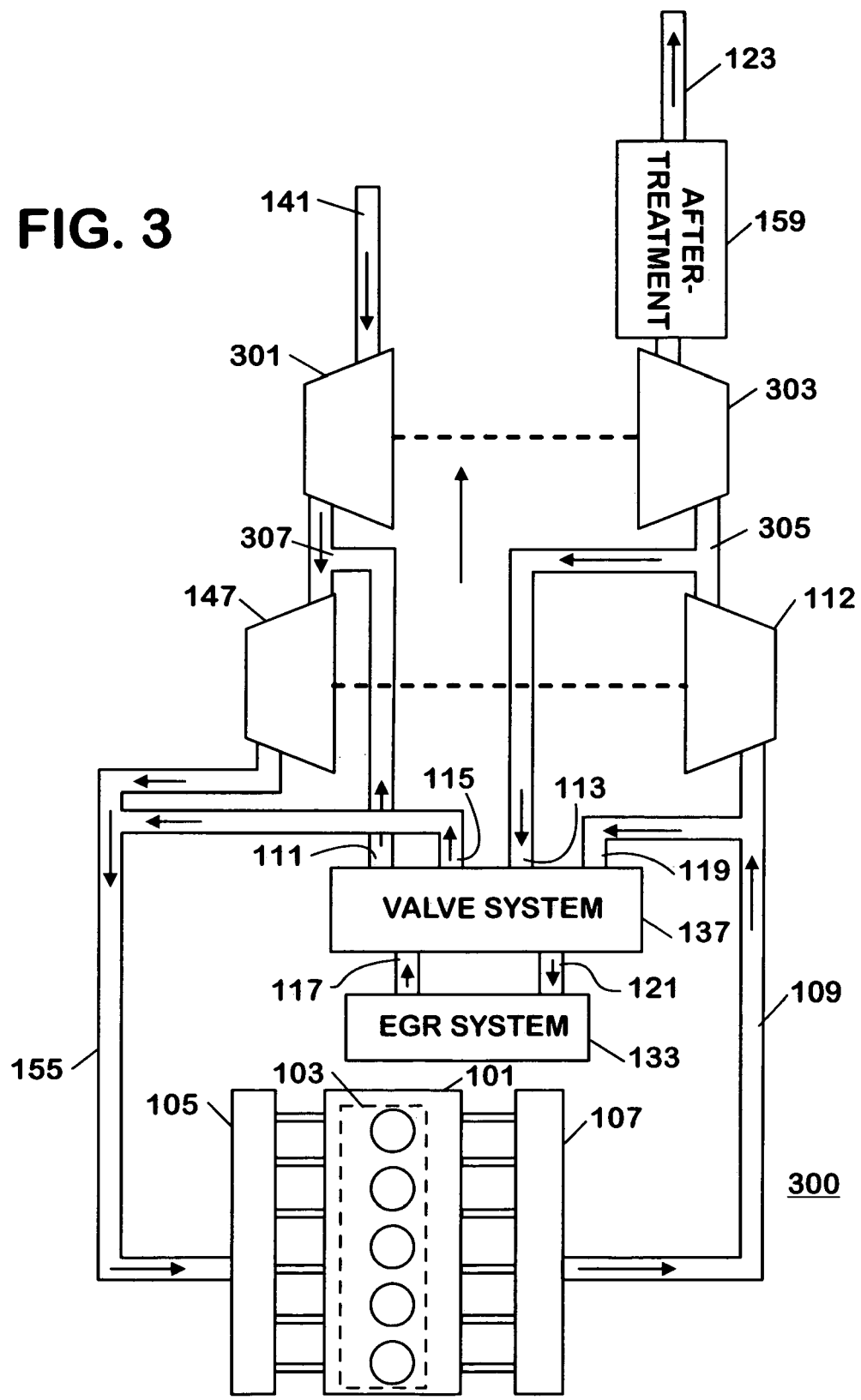
FIG. 3 is a block diagram of an engine having two turbochargers in accordance with the invention.
Figure 4:
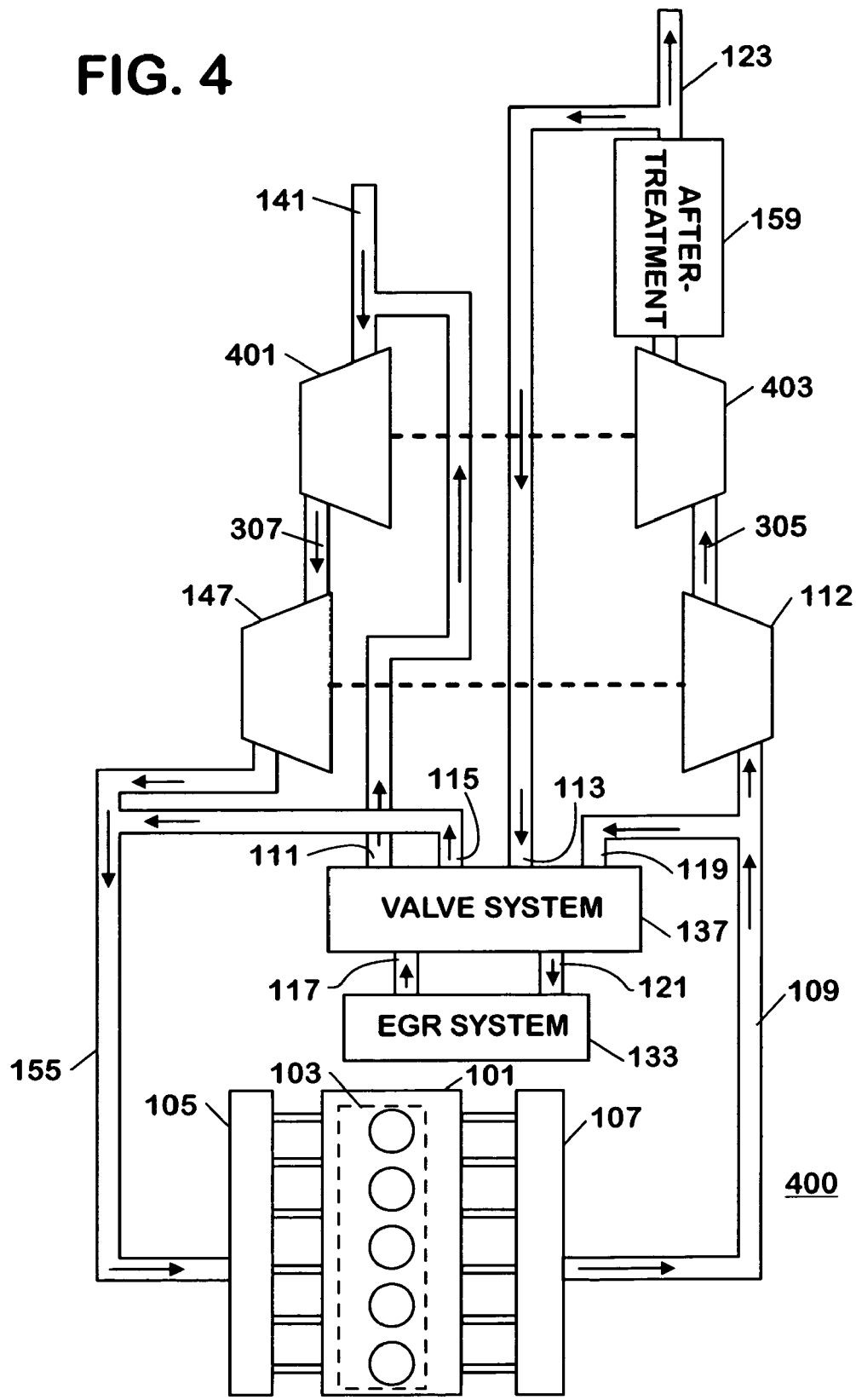
FIG. 4 is a block diagram of an engine system having two turbochargers in accordance with the invention.

An alternate embodiment used on an engine system 300 having two turbochargers is shown in FIG. 3. A first turbine 112 is upstream of a second turbine 303, while a second compressor 301 is upstream of a first compressor 147. This engine configuration avails use of an intermediate pressure region 305 for exhaust gas and 307 for intake charge air to be considered between the two turbines 112, 303 and the two compressors 301, 147 respectively. In comparison to the embodiment of FIG. 1, the low pressure region 123 of exhaust gas at the outlet of the second turbine 303 is replaced by an the intermediate pressure region 305 at the inlet of the second turbine 303 as an inlet to the EGR system 133, and the low pressure region 141 of intake air at the inlet of the second compressor 301 is replaced by the intermediate pressure region 307 at the outlet of the second compressor 301 as an outlet of the EGR system 133. In some instances, however, it may be desirable to use the high-pressure regions 109, 155 and low-pressure regions 123, 141 even if intermediate pressure regions 305, 307 are available. This situation is shown in FIG. 4, where dual turbochargers are part of an engine system 400. The valve system 137 is fluidly connected to the high-pressure regions 109, 155, the low-pressure regions 123, 141, and the EGR system 133, even though intermediate pressure regions 305, 307 are available.

Figure 5A:
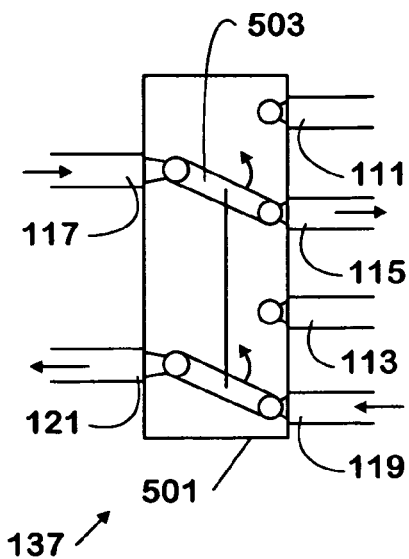
FIG. 5A through FIG. 5C are block diagrams showing examples of valve systems in accordance with the invention.
Figure 5B:
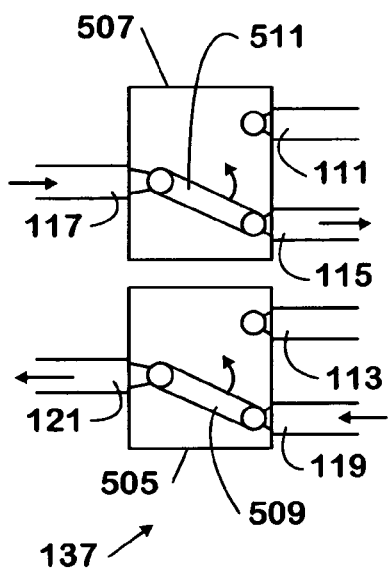
Figure 5C:
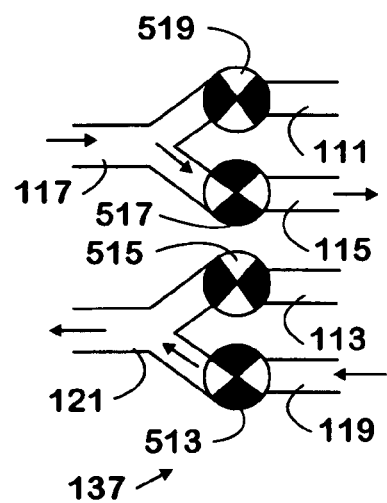

Three examples of possible arrangements for the valve system 137 are shown in FIG. 5A through FIG. 5C. The first example is a six-way two-position valve 501. The valve 501 has six ports and includes a moveable core 503 to fluidly connect two ports at a time. In the position shown in FIG. 5A port 119 is fluidly connected to port 121, and port 115 is fluidly connected to port 117. Ports 111 and 113 are fluidly blocked. In the alternative position of the core 503 in FIG. 5A, port 111 with port 117 and port 113 with 121 are fluidly connected to each other. Ports 119 and 115 are fluidly blocked.

Another example of a possible implementation for the valve system 137 is a set of two three-way two position valves 505 and 507, having two moveable cores 509 and 511, as shown in FIG. 5B. The valves 505 and 507 may be same or different. In the position shown in FIG. 5B, port 119 is fluidly connected to port 121, and port 115 is fluidly connected to port 117. Ports 111 and 113 are fluidly blocked. In the alternative position of the cores 507, 510 in FIG. 5B, port 111 with port 117 and port 113 with 121 are fluidly connected to each other. Ports 119 and 115 are fluidly blocked.

A third example of an implementation for the valve system 137 is a group of four two-way two position valves 513, 515, 517, and 519, as shown in FIG. 5C. These valves may be the same or different. In the position shown valves 513 and 517 are in an open position fluidly connecting port 119 with port 121, and port 115 with port 117. Valves 515 and 519 are in a closed position fluidly blocking ports 111 and 113.

An actuator or actuators may actuate the valve system 137. Valve actuators may advantageously be arranged according to the valve configuration utilized, and the actuators may use different modes of actuation, for example, electronic actuation using electric current, pneumatic actuation using exhaust gas or air pressure acting on a diaphragm, or hydraulic actuation using oil or coolant in a piston as the motive forces.

Figure 6A:
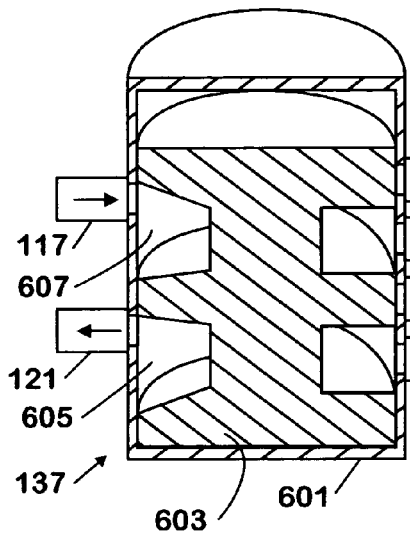
FIG. 6A and FIG. 6B are section views of an implementation of a six-way two-position valve in accordance with the invention.
Figure 6B:
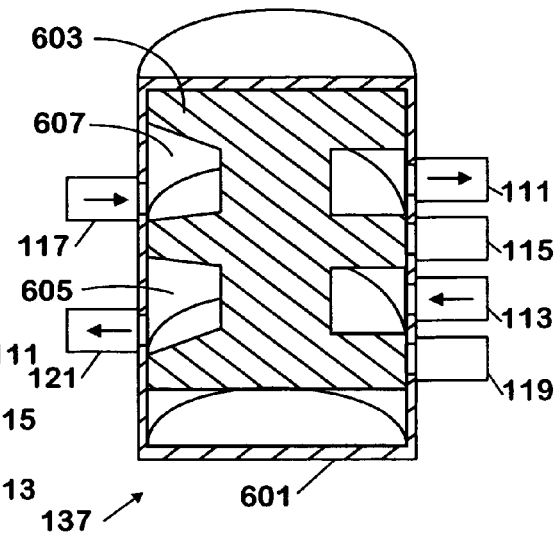

A section view of an implementation for a six-way two-position valve system, as presented in FIG. 5A, is shown in each of two operating positions in FIG. 6A and FIG. 6B. The valve housing 601 has six ports and includes a moveable core 603 to selectively fluidly connect two ports at a time. The core 603, which is enclosed in the valve housing 601, advantageously has a generally cylindrical shape with two circumferential grooves 605 and 607 in the core's 603 outer periphery for gas to flow through. In different arrangements, the core 603 may have more than two grooves, or may have a different configuration. In the position shown in FIG. 6A, port 119 is fluidly connected to port 121 through a first circumferential groove 605, and port 115 is fluidly connected to port 117 through a second circumferential groove 607. The core 603 fluidly blocks ports 111 and 113 in this position. In the alternative position of the core 603 as shown in FIG. 6B, port 113 is fluidly connected to port 121 through the first circumferential groove 605, and port 111 is fluidly connected to port 117 through the second circumferential groove 607. The core 603 fluidly blocks ports 119 and 115.

Figure 7A:
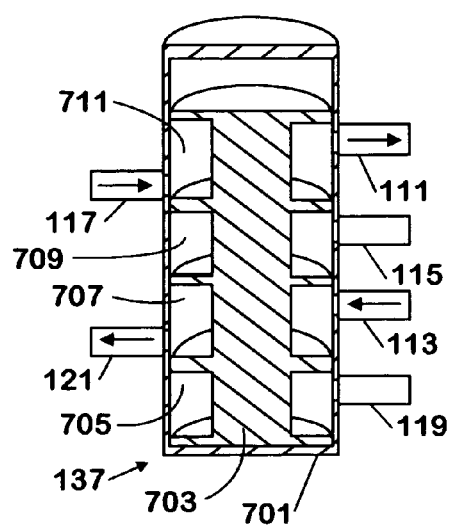
FIG. 7A and FIG. 7B are section views of an alternative implementation of a six-way two-position valve in accordance with the invention.
Figure 7B:
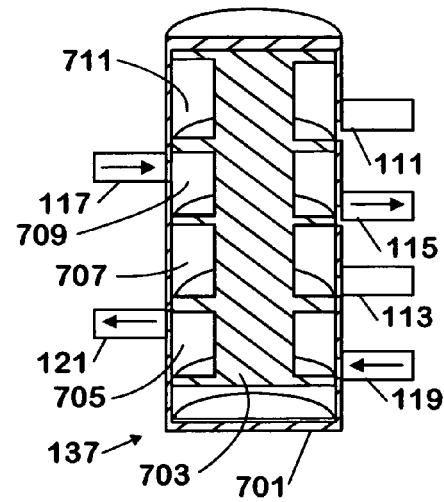

A different embodiment for a six-way two-position valve system with a core having four circumferential grooves is shown in FIG. 7A and FIG. 7B. A valve housing 701 has six ports and includes a moveable core 703 to selectively fluidly connect two ports at a time. The core 703, which is enclosed in the valve housing 701, advantageously has a generally cylindrical shape with four circumferential grooves 705, 707, 709, and 711 in the core's 703 outer periphery for gas to flow through. In the position shown in FIG. 7A, port 113 is fluidly connected to port 121 through the circumferential groove 707, and port 111 is fluidly connected to port 117 through the circumferential groove 711. The core 703 fluidly blocks ports 119 and 115 in this position. In the alternative position of the core 703 as shown in FIG. 7B, port 119 is fluidly connected to port 121 through the circumferential groove 705, and port 115 is fluidly connected to port 117 through the circumferential groove 709. The core 703 fluidly blocks ports 119 and 115 in the position shown in FIG. 7A, and ports 113 and 111 in the position shown in FIG. 7B.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising the steps of:
   in a high mode of engine operation,
      directing high-pressure exhaust gas from upstream of a turbine in an exhaust system of an engine into an exhaust gas recirculation (EGR) path that outputs recirculated gas into the engine air intake system at a location downstream of a compressor;
   in a low mode of engine operation,
      directing low-pressure exhaust gas from downstream of the turbine into the EGR path, and outputting recirculated gas into the engine air intake system at a location upstream of the compressor; and
   changing a position of a six-way two-position valve at times when an engine operation changes from the high mode of engine operation to the low mode of engine operation.

2. The method of claim 1, wherein the high mode of engine operation occurs when an internal combustion engine operates at high engine speed, and wherein the low mode of engine operation occurs when an internal combustion engine operates at low engine speed.

3. The method of claim 1, further comprising the step of cooling at least one of the high-pressure exhaust gas and the low-pressure exhaust gas in the EGR path.

4. The method of claim 1, further comprising the step of blocking a low pressure exhaust gas from entering the engine air intake system during the high mode of engine operation.

5. The method of claim 1, further comprising the step of blocking a high pressure exhaust gas from entering the engine air intake system during the low mode of engine operation.

6. A method comprising the steps of:
   routing exhaust gas from upstream of a turbine in an exhaust system of an engine, through an exhaust gas recirculation path, to downstream of a compressor of an intake system of the engine during a high mode of engine operation;
   circulating exhaust gas from downstream of the turbine in the exhaust system of the engine, through the exhaust gas recirculation path, to upstream of the compressor of the intake system of the engine during a low mode of engine operation;
   directing the exhaust gas through the exhaust gas recirculation path; and
   changing a position of a six-way two-position valve at times when an engine operation changes from the high mode of engine operation to the low mode of engine operation.

7. The method of claim 6, further comprising the step of switching a valve system based on a change of a mode of engine operation.

8. The method of claim 6, wherein the step of circulating comprises fluidly blocking, with a valve system, the exhaust gas from upstream of the turbine from entering the intake system of the engine.

9. The method of claim 6, wherein the step of routing comprises fluidly blocking, with a valve system, the exhaust gas from downstream of the turbine from entering the intake system of the engine.

10. The method of claim 6, further comprising the step of switching a valve system by sending a position command to at least one actuator of the valve system.

11. The method of claim 6, further comprising the step of cooling the exhaust gas in the exhaust gas recirculation path.

12. An engine system comprising:
    a valve system;
    an inlet of a first turbine fluidly connected to a first inlet of the valve system;
    an outlet of the first turbine fluidly connected to a second inlet of the valve system;
    an outlet of a first compressor fluidly connected to a first outlet of the valve system;
    an inlet of the first compressor fluidly connected to a second outlet of the valve system;
    an inlet of an exhaust gas recirculation cooler fluidly connected to a third outlet of the valve system; and
    an outlet of the exhaust gas recirculation cooler fluidly connected to a third inlet of the valve system;
    wherein the valve system is a six-way two-position valve.

13. The engine system of claim 12, further comprising a second turbine disposed between the outlet of the first turbine and the second inlet of the valve system, and a second compressor disposed between the inlet of the first compressor and the second outlet of the valve system.

14. The engine system of claim 12, further comprising an exhaust gas cooler in fluid communication with the valve system.

15. The engine system of claim 1, wherein the valve system further comprises at least one three-way two-position valve.

16. The engine system of claim 15, wherein the valve system further comprises two three-way two-position valves.

17. The engine system of claim 1, wherein the valve system further comprises at least one two-way valve.

18. The engine system of claim 17, wherein the valve system further comprises four two-way valves.

19. The engine system of claim 12, wherein the valve system is actuated by at least one of: electrical current, air, exhaust gas, oil, fuel, and coolant.

* * * * *